United States Patent
Hosdez et al.

[19]
[11] Patent Number: 5,935,009
[45] Date of Patent: Aug. 10, 1999

[54] TRIPOD CONSTANT VELOCITY UNIVERSAL JOINT

[75] Inventors: Didier Hosdez; Piotr Olszewski, both of Haguenau, Germany

[73] Assignee: Ina Walzlager Schaeffler KG, Germany

[21] Appl. No.: 08/743,745

[22] Filed: Nov. 7, 1996

[30] Foreign Application Priority Data

Nov. 14, 1995 [DE] Germany .......................... 195 44 174

[51] Int. Cl.$^6$ .................................................. F16D 3/205
[52] U.S. Cl. ........................................... 464/111; 464/905
[58] Field of Search .................................... 464/111, 120, 464/122, 123, 124, 905, 132

[56] References Cited

U.S. PATENT DOCUMENTS

| | | | |
|---|---|---|---|
| 3,975,922 | 8/1976 | Orain | 464/905 X |
| 4,854,917 | 8/1989 | Mizukoshi | 464/11 |
| 5,019,016 | 5/1991 | Uchman . | |
| 5,069,653 | 12/1991 | Mizukoshi | 464/111 |
| 5,330,389 | 7/1994 | Jost et al. | 464/905 X |
| 5,505,660 | 4/1996 | Van Dest | 464/905 X |

FOREIGN PATENT DOCUMENTS

| | | | |
|---|---|---|---|
| 885904 | 9/1943 | France . | |
| 4110311 | 10/1991 | Germany | 464/111 |
| 4130956 | 4/1993 | Germany | 464/111 |
| 4142214 | 7/1993 | Germany | 464/111 |
| 92182852 | 5/1994 | Germany . | |
| 94080577 | 8/1994 | Germany . | |
| 4336466 | 4/1995 | Germany . | |
| 57-83721 | 5/1982 | Japan | 464/111 |
| 5-10344 | 1/1993 | Japan | 464/111 |

*Primary Examiner*—Eileen Dunn Lillis
*Attorney, Agent, or Firm*—Bierman, Muserlian and Lucas

[57] ABSTRACT

A tripod constant velocity universal joint comprising a housing (5) having longitudinal grooves (4) arranged in spaced relationship on a periphery thereof, and a tripod spider (2) comprising symmetrically arranged, rotationally symmetrical ball-headed trunnions (3) on which an inner ring (6) comprised of two semi-shells or made as a split ring is retained in a form-fitted manner for angular displacement, said inner ring (6) being radially surrounded by a guide element (7) with rolling elements (10) arranged between the guide element (7) and an outer ring (11) which is guided outwardly for sliding displacement in the longitudinal grooves (4), characterized in that a length of the rolling elements (10) is larger than a width of the outer ring (11), the guide element (7) as seen in longitudinal cross-section is U-shaped and comprises end flanges (8, 9) which extend radially outwards so as to project beyond an inner diameter of the outer ring 11.

7 Claims, 4 Drawing Sheets

TRIPOD CONSTANT VELOCITY UNIVERSAL JOINT

FIELD OF THE INVENTION

The invention concerns a tripod type constant velocity universal joint comprising a housing having longitudinal grooves arranged in spaced relationship on a periphery thereof, and a tripod spider comprising symmetrically spaced trunnions having ball-headed ends on which an inner ring comprised of two semi-shells or made as a split ring is retained in a form-fitted manner for angular displacement, said inner ring being radially surrounded by a guide element with rolling elements arranged between the guide element and an outer ring which is guided outwardly for sliding displacement.

BACKGROUND OF THE INVENTION

A constant velocity universal joint of the above type is known from DE 43 36 466 A1 in which there is provided a guide element made by cutting whose longitudinal extent corresponds to the width of the outer ring. The length of the rolling elements, however, is clearly smaller than the width of the outer ring. On a strong deflection of the tripod joint for example, which causes an axial displacement between the inner and outer ring, such a configuration can lead to an increased loading of the rolling elements because the load is not applied to the entire length thereof.

OBJECTS OF THE INVENTION

It is an object of the invention to provide an economically manufacturable, constant velocity universal joint in which the load-receiving length of the rolling elements remains constant irrespective of the degree of deflection of the joint.

This and other objects and advantages of the invention will become obvious from the following detailed description.

SUMMARY OF THE INVENTION

The invention achieves its object with a tripod type constant velocity universal joint of the initially cited type by the fact that the length of the rolling elements is larger than the width of the outer ring. The tripod constant velocity universal joint of the invention further comprises a U-shaped guide element having radially outward oriented end flanges which are dimensioned in the radial direction so as to extend beyond an inner diameter of the outer ring.

The configuration of the guide element whose flanges extend radically beyond the inner bore of the outer ring creates an effective guidance for the outer ring and a security against loss without the use of additional components and thus presents particular advantages for pre-assembly.

This configuration assures that no matter what the position of the outer ring relative to the rolling elements, the load-receiving length of the rolling elements remains constant i.e., the region of contact between the outer ring and the rolling elements always corresponds to the width of the outer ring. Such a structural design advantageously reduces wear and thus improves the service life and durability of the tripod constant velocity universal joint. The configuration of the guide element whose flanges extend radially beyond the inner bore of the outer ring creates an effective guidance for the outer ring and a security against loss without the use of additional components and thus presents particular advantages for pre-assembly.

In a preferred embodiment of the invention, the longitudinal extent of the rolling element is 1.1 to 1.4 times the width of the outer ring. Such an overlap of length of the rolling elements guarantees in every position, even with extreme deflections of the constant velocity universal joint, that load is applied to a length of the rolling elements corresponding to the width of the outer ring.

With a view to cost reduction, the guide element is chiplessly formed out of sheet metal by deep drawing which offers particular cost advantages for large-scale manufacture and due to the smaller wall thickness obtained by its manufacturing method, it has a reduced weight and requires less design space. To achieve a firm seating, the guide element is retained on the inner ring under pretension, for instance by a press fit or a shrink fit. These measures effect a firm retention of the semi-shells of the inner ring on the ball-headed trunnion of the tripod spider. A split inner ring can be retained in the same manner by the guide element on the ball head of the tripod spider. To simplify assembly, according to the invention, a free end of one of the flanges of the guide element comprises circumferentially spaced knobs whose outer diameter corresponds to that of the opposite flange. By this measure, an axial pushing-on of the outer ring on to the rolling elements is facilitated.

In accordance with another aspect of the invention, in the installed state of the constant velocity universal joint, the outer ring is arranged offset relative to the inner ring so that the rolling elements project beyond the outer ring. This measure assures that, on deflection i.e., when the housing pivots relative to the tripod spider and causes the inner ring and the rolling elements connected thereto to be displaced relative to the outer ring towards the center of the universal joint, the rolling elements are always loaded over a length corresponding to the width of the outer ring.

The invention further provides that in the neutral position of the universal joint, the ends of the outer and the inner ring oriented towards the center of the universal joint are aligned to each other. The projecting length of the rolling elements is thus situated at the end of the outer ring, remote from the center of the tripod spider. A deflection always causes the trunnion together with the inner ring and the rolling elements to be displaced axially inwards i.e. towards the center of the joint, while the outer ring retains its position in the housing. The projecting length of the rolling elements relative to the outer ring is therefore adapted to the direction of displacement of these components.

Advantageously, the outer peripheral surface of the outer ring which is guided in circumferentially spaced longitudinal grooves in the housing can be given different configurations. Depending on the strength requirements or for simplifying manufacture, this peripheral surface can be cylindrical, spherical or slightly domed and cooperate with longitudinal grooves of corresponding shape.

In another aspect of the invention, the life duration of the universal joint is improved if the ball head of the trunnion comprises two flattened regions situated diametrically opposite each other outside of the bearing zone and serving as lubricant reservoirs. At the pre-assembly stage, lubricant, particularly grease, can be applied to the flattened regions and, in the installed state, this lubricant moves on to the sliding surface of the ball head and assures a friction-reducing permanent lubrication of the sliding pair: inner ring and trunnion.

DETAILED DESCRIPTION OF THE DRAWINGS

Figure 1:
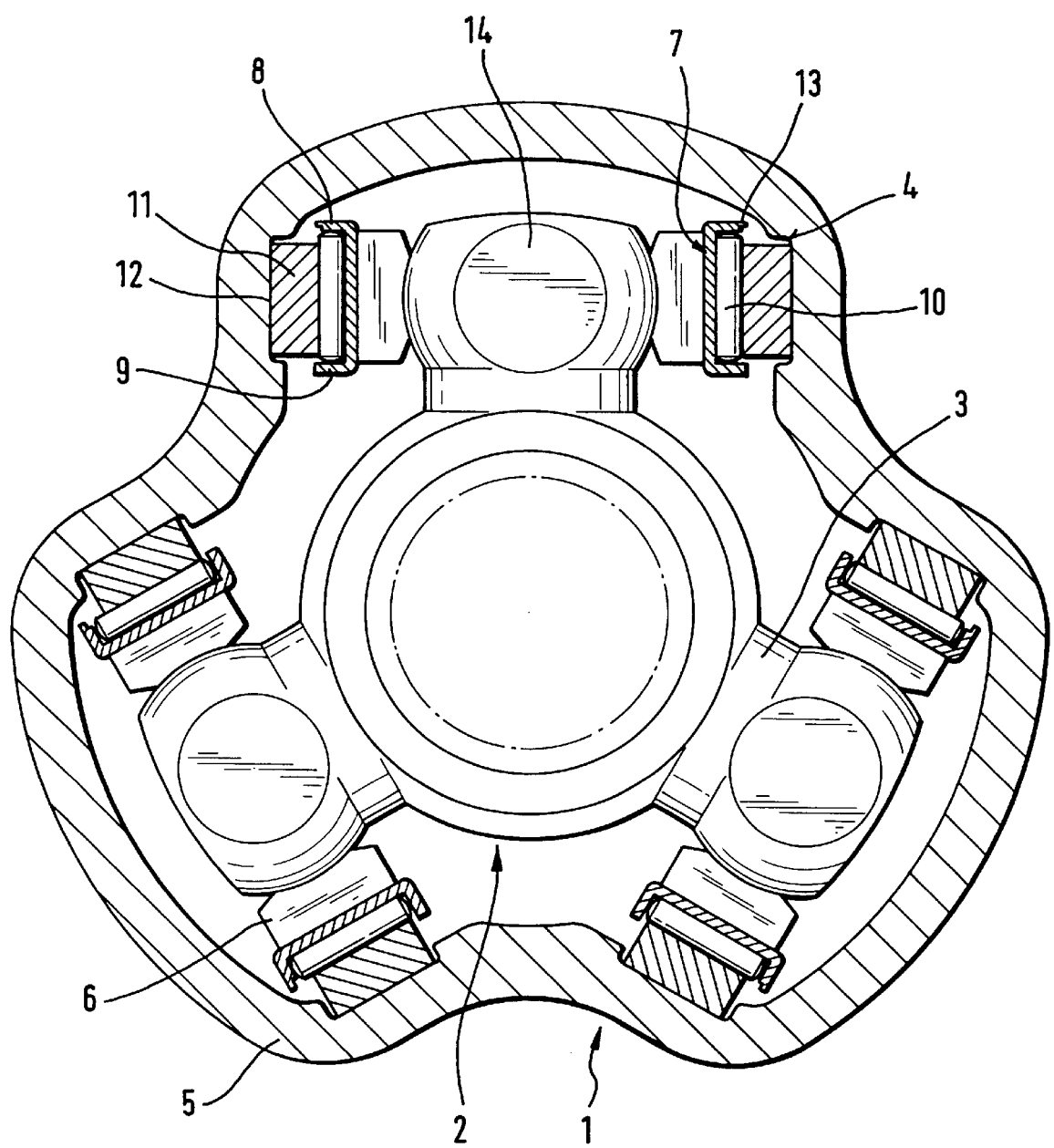
FIG. 1 is a front view of the constant velocity universal joint of the invention.

FIG. 1 shows a front view of a constant velocity universal joint referenced at 1. The constant velocity universal joint 1 comprises a tripod spider 2 having three circumferentially spaced trunnions 3 whose free ends are configured as ball heads, on each of which a rolling bearing is arranged for the mounting of the tripod spider. The rolling bearings are guided outwardly for displacement in longitudinal grooves 4 of a housing 5 and comprise an inner ring 76 which is composed of two semi-shells or is a one-piece split ring. The inner contour of the inner ring is spherical to correspond to the outer contour of the ball-headed end of the trunnion 3. Positionally fixed outwardly on the inner ring 6 is a chiplessly made deep drawn sheet metal guide element 7 having radially outward oriented flanges 8, 9 on each end. Rolling elements 10 inserted into the guide element 7 are surrounded outwardly by an outer ring 11 which has a cylindrical outer peripheral surface 12 and is guided for displacement in the longitudinal grooves 4 of the housing 5.

To create a captivated unit at the pre-assembly stage and for a guidance of the rolling elements 10, the radial dimension of the flanges 8, 9 is chosen so that the flanges extend beyond the region of the inner diameter of the outer ring 11 which is thus positionally fixed relative to the inner ring 6 and the guide element 7. To simplify assembly, the free end of the flange 8 comprises over a part of its length, a portion 13 of reduced wall thickness or knob. This improves the elasticity of the flange 8 and thus facilitates an axial pushing-on of the outer ring 11.

The length of the rolling elements 10 used in the constant velocity universal joint 1 of the invention is dimensioned so as to correspond to the width of the inner ring 6 while being clearly larger than the width of the outer ring 11. This measure assures that on a relative displacement between the outer ring 11 and the rolling elements 10 which occurs on a deflection of the joint 1, the load-receiving length of the rolling elements 10 always corresponds to the width of the outer ring 11 in all positions i.e., irrespective of the degree of deflection of the joint 1.

Figure 2:
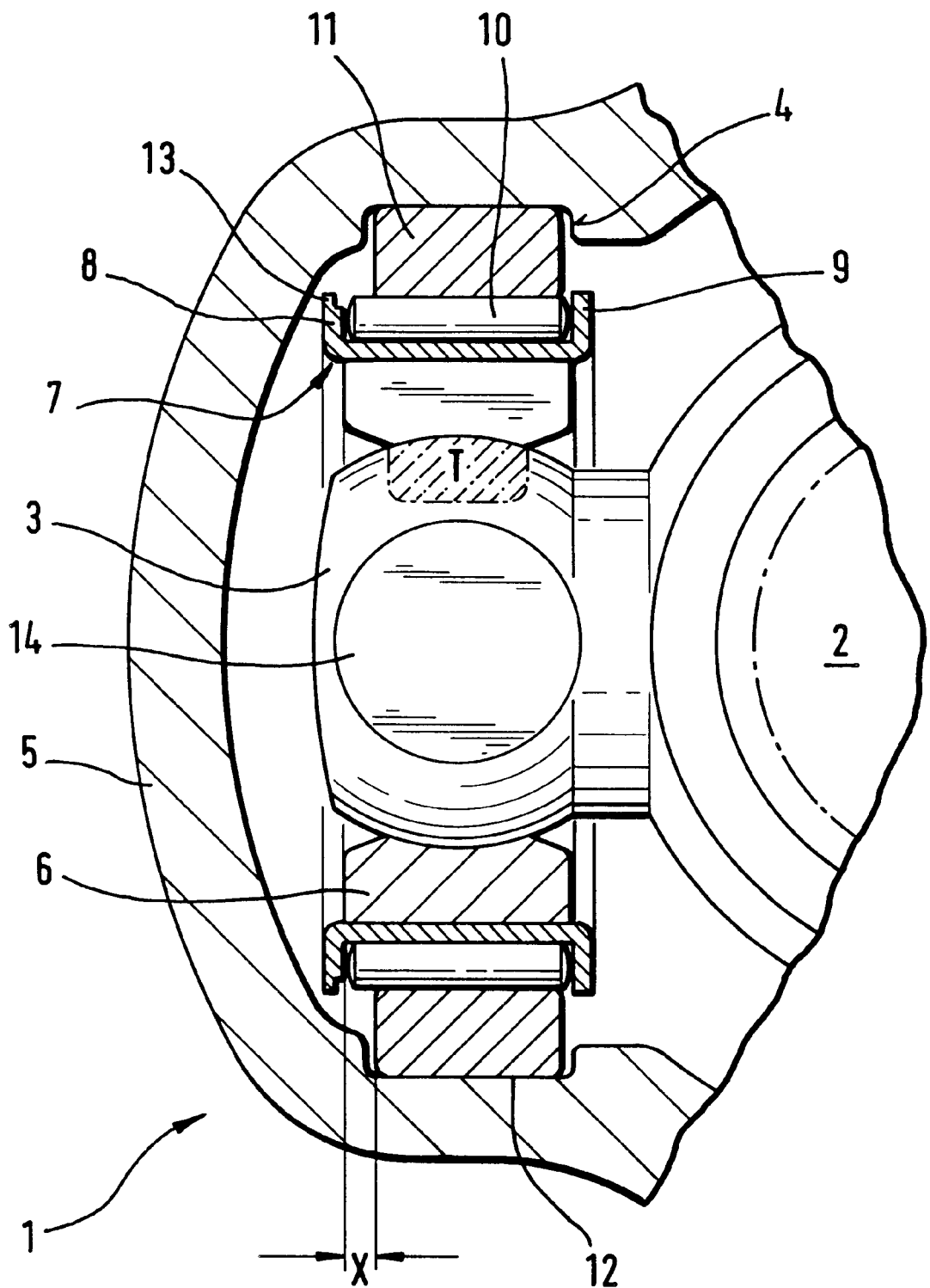
FIG. 2 is an enlarged detail of the constant velocity universal joint of FIG. 1 comprising an outer ring having a cylindrical peripheral surface.
Figure 3:
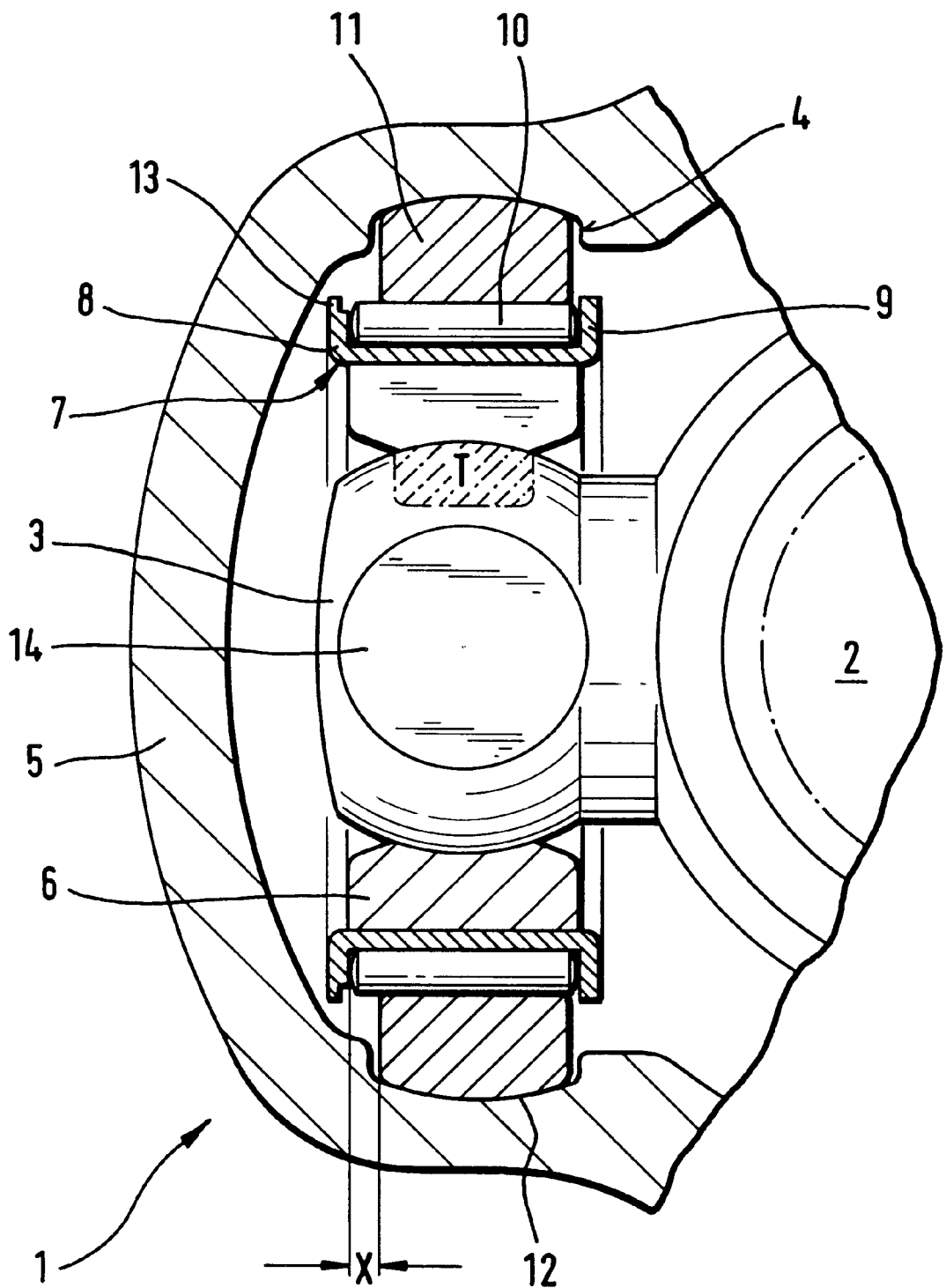
FIG. 3 is a detail corresponding to that of FIG. 2 but showing an outer ring having a domed peripheral surface.

The features of the invention can be seen more clearly in the enlarged detail of the constant velocity universal joint 1 of the invention shown in FIG. 2. This figure particularly shows that in the neutral position of the constant velocity universal joint 1, the ends of the inner ring 16 and the outer ring 18, 1 oriented toward the tripod spider 2 are substantially in alignment with one another. Thus, due to the difference in width between the rolling elements 10 and the outer ring 18, the projecting length "X" of the rolling elements 10 is situated exclusively at the end of the outer ring 18 remote from the tripod spider 2. The trunnions 3 further comprise two flattened regions 14 which are situated diametrically opposite each other outside of a bearing zone "T" and contribute to a reduction of weight of the joint. These flattened regions 14 also result in the formation of an interspace which can be filled with a viscous lubricant when the inner ring 16 is mounted. The lubricant assures a permanent lubrication of the surfaces of contact between the trunnion 3 and the inner contour of the inner ring 16. The inner ring 6 shown in FIG. 2 is a one-piece split ring which can be widened for mounting on the trunnion 3. In contrast to FIG. 2, the outer ring 23 shown in FIG. 3 has a domed or spherical outer peripheral surface 24 which cooperates with longitudinal grooves 4 of corresponding shape in the housing 5.

Figure 4:
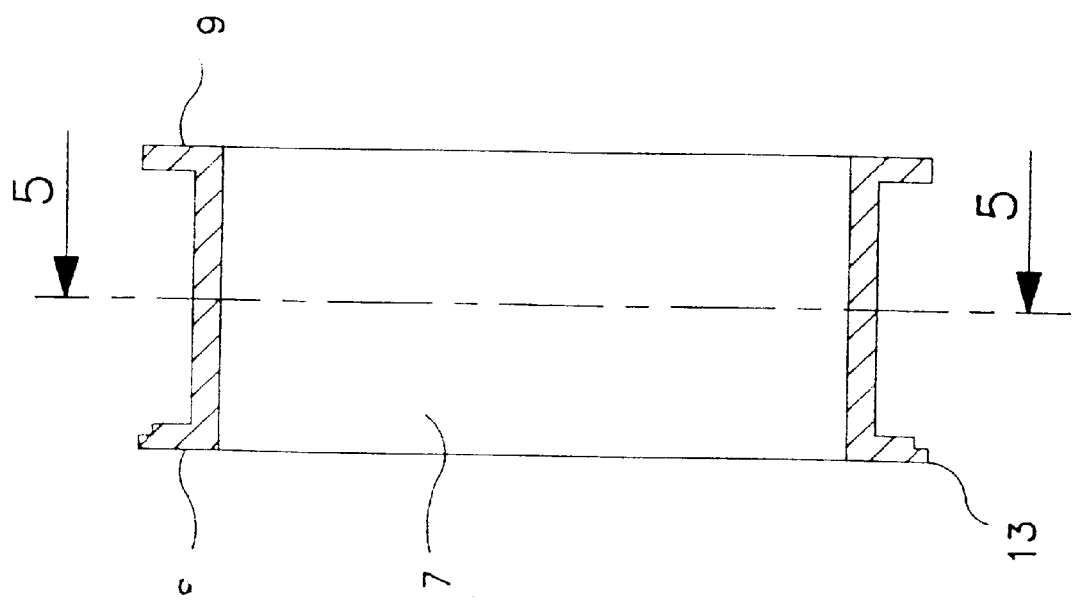
FIG. 4 shows the guide element in a detail unit drawing.

FIG. 4 shows a longitudinal cross-section of the guide element in a detail unit drawing which clearly shows a correspondence between the outer diameters of the flanges 8 and 9. In its outer region, the flange 8 has a reduced thickness and comprises a plurality of circumferentially spaced knobs 13.

Figure 5:
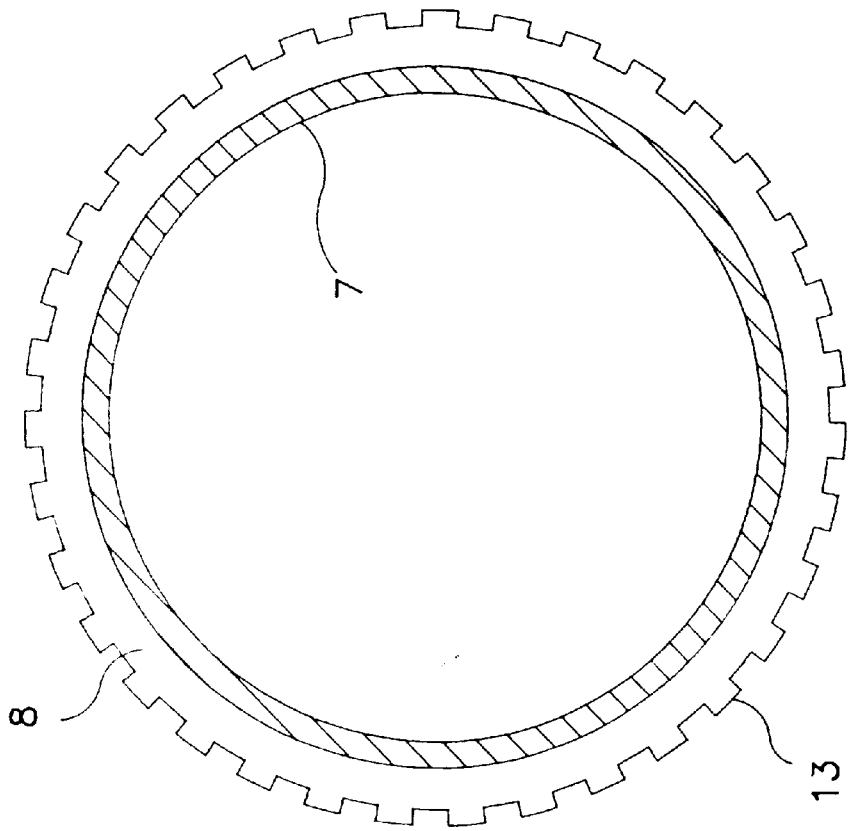
FIG. 5 is a sectional view of the guide element along line V—V of FIG. 4.

FIG. 5 shows the guide element 7 in a sectional view along line V—V in which the knobs 13 which are spaced uniformly along the periphery of the flange 8 become visible.

Various modifications of the universal joint of the invention may be made without departing from the spirit or scope thereof and it is to be understood that the invention is intended to be limited only as defined in the appended claims.

What we claim is:

1. A tripod constant velocity universal joint comprising a housing (5) having longitudinal grooves (4, 15, 20) arranged in spaced relationship on a periphery thereof, and a tripod spider (2) comprising symmetrically arranged, rotationally symmetrical ball-headed trunnions (3) on which an inner ring (6, 16, 21) made as a split ring is mounted for angular movement, said inner ring (6, 16, 21) being radially surrounded by a guide element (7, 17, 22) with rolling elements (10) arranged between the guide element (7, 17, 22) and an outer ring (11, 18, 23) which is guided outwardly for rolling in the longitudinal grooves (4, 15, 20), characterized in that the longitudinal dimension of the rolling elements (10) is larger than a longitudinal dimension of the outer ring (11, 18, 23), the guide element (7, 17, 22) is made out of sheet metal without chip removal as seen in longitudinal cross-section, the guide element is U-shaped and comprises first end flanges (8), and second end flanges (9) which extend radially outwards so as to project beyond an inner diameter of the outer ring (11, 18, 23), the guide element (7, 17, 22) is positionally fixed under pretension of the inner ring (6, 16, 21) and a free end of said first flanges (8) of the guide element (7, 17, 22) comprises a plurality of circumferentially spaced knobs (13) means for improving an elasticity of said first flanges (8) whereby an outer diameter of said first flanges (8) corresponds to that of the second flanges (9) of the guide element (7, 17, 21).

2. A tripod constant velocity universal joint of claim 1 wherein the longitudinal dimension of the rolling elements (10) is 1.1 to 1.4 times the longitudinal dimension of the outer ring (11, 18, 23).

3. A tripod constant velocity universal joint of claim 1 wherein in the installed state of the constant velocity universal joint (1), the outer ring (11, 18, 23) is arranged axially offset in direction to the tripod spider (2) relative to the inner ring (6, 16, 21).

4. A tripod constant velocity universal joint of claim 1 wherein the end faces of the inner ring (6) and the outer ring (11, 18, 23) oriented towards the tripod spider (2) are aligned to each other.

5. A tripod constant velocity universal joint of claim 1 wherein the outer ring (11, 18, 23) comprises a cylindrical outer peripheral surface (12).

6. A tripod constant velocity universal joint of claim 1 wherein the outer ring (11, 18, 23) comprises a spherical outer peripheral surface (12).

7. A tripod constant velocity universal joint of claim 1 wherein the trunnion (3) comprises two flattened regions (14) situated diametrically opposite each other which, in the installed state of the constant velocity universal joint (91) define together with the inner ring (8, 16, 21) cavities which can be used as lubricant reservoirs.

* * * * *